(12) United States Patent
Chin et al.

(10) Patent No.: US 8,326,276 B2
(45) Date of Patent: Dec. 4, 2012

(54) PROXIMITY BASED CALL MANAGEMENT

(75) Inventors: Jae-Sun Chin, Helotes, TX (US); Larry B. Pearson, San Antonio, TX (US); Michael T. Delaney, Jr., San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1358 days.

(21) Appl. No.: 11/479,064

(22) Filed: Jun. 30, 2006

(65) Prior Publication Data

US 2008/0004002 A1    Jan. 3, 2008

(51) Int. Cl.
*H04M 3/42*    (2006.01)
(52) U.S. Cl. ........................................... 455/416
(58) Field of Classification Search ................. 455/416, 455/403
See application file for complete search history.

(56) References Cited

U.S. PATENT DOCUMENTS

| | | | | |
|---|---|---|---|---|
| 5,594,782 | A * | 1/1997 | Zicker et al. ................ | 455/417 |
| 5,745,850 | A * | 4/1998 | Aldermeshian et al. ...... | 455/417 |
| 6,195,545 | B1 | 2/2001 | Baker et al. | |
| 6,253,088 | B1 * | 6/2001 | Wenk et al. .................. | 455/462 |
| 6,675,015 | B1 | 1/2004 | Martini et al. | |
| 6,834,192 | B1 | 12/2004 | Watanabe et al. | |
| 6,874,037 | B1 | 3/2005 | Abram et al. | |
| 2002/0085516 | A1 * | 7/2002 | Bridgelall ..................... | 370/329 |
| 2003/0003900 | A1 * | 1/2003 | Goss et al. .................... | 455/417 |
| 2003/0073431 | A1 * | 4/2003 | Dorenbosch .................. | 455/417 |
| 2004/0066776 | A1 | 4/2004 | Ishidoshiro | |
| 2004/0213212 | A1 | 10/2004 | Reding et al. | |
| 2004/0266425 | A1 | 12/2004 | Gonsalves et al. | |
| 2005/0063528 | A1 * | 3/2005 | Pearson et al. ........... | 379/211.01 |
| 2005/0064853 | A1 | 3/2005 | Radpour | |
| 2005/0064855 | A1 | 3/2005 | Russell | |
| 2005/0078612 | A1 * | 4/2005 | Lang ............................. | 370/260 |
| 2005/0096024 | A1 | 5/2005 | Bicker et al. | |
| 2005/0277431 | A1 | 12/2005 | White | |
| 2006/0003806 | A1 | 1/2006 | Weber et al. | |
| 2007/0060124 | A1 * | 3/2007 | Kalavade ...................... | 455/433 |
| 2009/0131026 | A1 * | 5/2009 | Allen et al. ................... | 455/417 |

OTHER PUBLICATIONS

Translation of International Preliminary Examination Report for Application No. PCT/DE2004/001785.

* cited by examiner

*Primary Examiner* — Nathan Mitchell
(74) *Attorney, Agent, or Firm* — G. Michael Roebuck

(57) ABSTRACT

A method is disclosed for proximity-based call management that includes sensing a proximity event between a first device associated with a first network and a second device associated with a second network, sending a first communication address for the first device from the first device to the second device over a wireless communication path between the first device and the second device, and signaling the second network from the second device to establish a conference call between the first device and the second device. A proximity based call management apparatus is disclosed including a processor coupled to a memory, a proximity sensor in data communication with the processor, a network interface in data communication with the processor, and a computer program stored in the memory for execution by the processor, the computer program comprising instructions proximity-based call management.

22 Claims, 14 Drawing Sheets

PROXIMITY BASED CALL MANAGEMENT

BACKGROUND OF THE DISCLOSURE

1. Field of the Disclosure

The present disclosure relates generally to proximity based call management of calls between wireless mobile telephones and fixed wire line telephones.

2. Description of the Related Art

Mobile telecommunications have become an accepted part of every day life. In an increasingly mobile society, mobile telephones and telecommunications devices have become commonplace. Cell phones and other mobile telecommunications devices offer the ability to be in contact or reachable at all times and places. However, users of mobile phones typically have more than one phone number at which they can be reached (e.g., mobile, home, office, etc.). For example, cellular telephone users may also have a landline phone number for their home or office. Receiving a call on a mobile phone can be more expensive or less convenient than receiving a phone call on the user's landline phone. Mobile phones also may be susceptible to a relative quality of service degradation as compared to a landline telephone.

There are times when a mobile phone user had rather receive calls on a landline rather than a mobile phone. Thus, when a mobile phone user is at home or at the office, a mobile phone user may wish to take calls on the home or office landline phone rather than a mobile phone.

DETAILED DESCRIPTION

Figure 1:
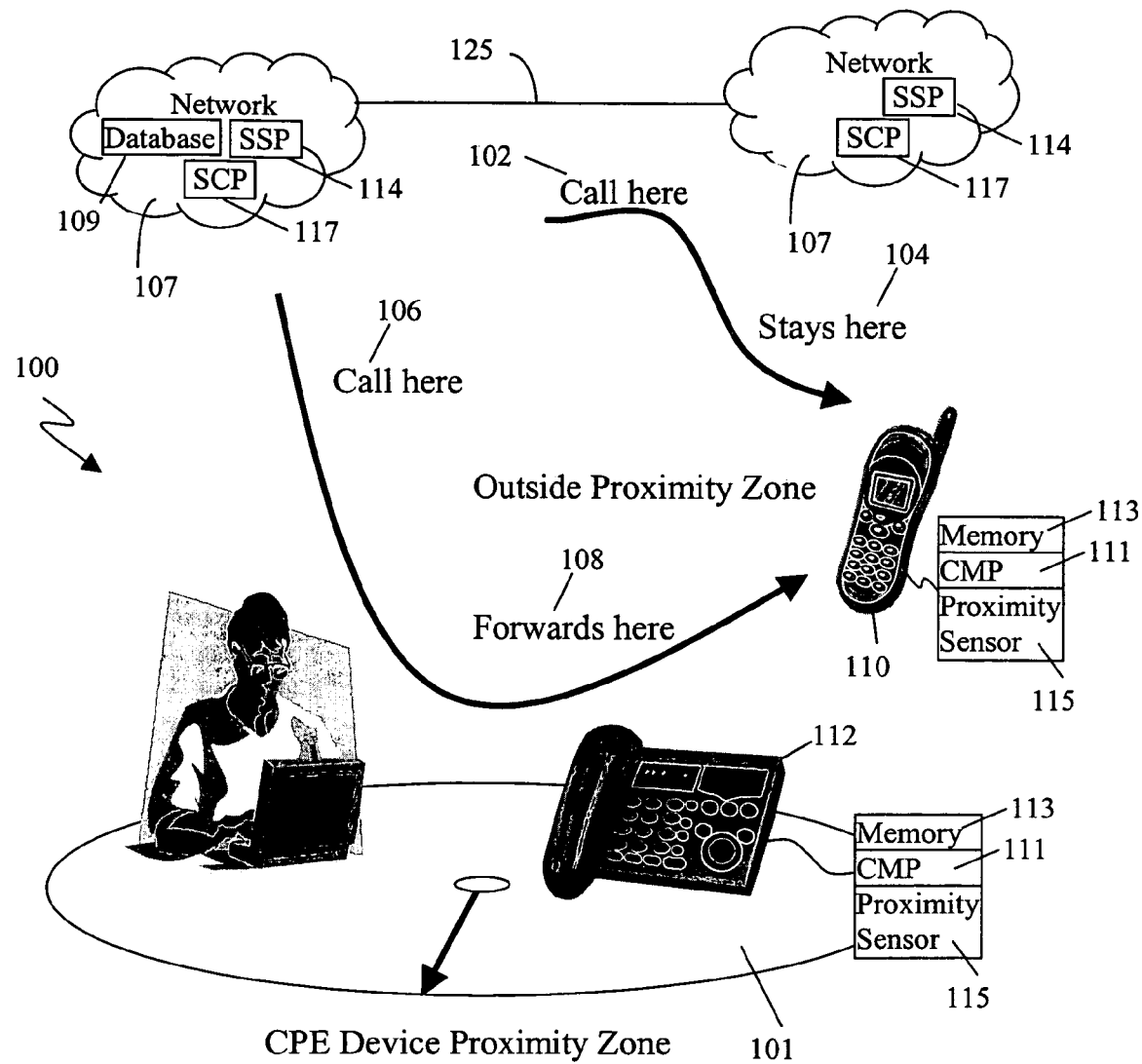
FIG. 1 depicts an illustrative embodiment of a call management system for a mobile phone outside of a proximity zone.

In view of the above, an illustrative embodiment is presented through one or more of its various aspects to provide one or more advantages, such as those noted below.

In a particular embodiment a method for proximity-based call management is disclosed. The method includes sensing a proximity event between a first device associated with a first network and a second device associated with a second network, sending a first communication address for the first device from the first device to the second device over a wireless communication path between the first device and the second device, and signaling the second network from the second device to establish a conference call between the first device and an ongoing call on the second device. In another aspect of a particular embodiment the first network and the second network are the same network. In another aspect of a particular embodiment wherein the communication address is sent using a short messaging service message. In another aspect of a particular embodiment the method further includes sensing a loss of proximity between the first device and the second device and signaling the first network from the first device to establish a conference call between the first device and the second device.

In another aspect of a particular embodiment the first device is a wireline base station telephone and the second device is a mobile telephone.

In another aspect of a particular embodiment the method further includes sensing a proximity event between the first device and a third device, sending the communication address for the first device from the first device to the third device over a wireless communication path between the first device and the third device, and signaling a third network to establish a conference call between the first device and the third device. In another aspect of a particular embodiment sensing a proximity event further includes accepting a signal from a device selected from the group consisting of the second device and the first device to establish a conference call between the first device and the second device.

In another particular embodiment a proximity based call management apparatus is disclosed. The apparatus includes a processor coupled to a memory, a proximity sensor in data communication with the processor, a network interface in data communication with the processor, and a computer program stored in the memory for execution by the processor. The computer program includes instructions to sense a proximity event between a first device associated with a first network and a second device associated with a second network, instructions to send a first communication address for the first device from the first device to the second device over a wireless communication path between the first device and the second device, and instructions to signal the second network from the second device to establish a conference call between the first device and an ongoing call on the second device.

In another aspect of a particular embodiment the first network and the second network are the same network. In another aspect of a particular embodiment wherein the communication address is sent using a short messaging service message. In another aspect of a particular embodiment the computer program further includes instructions to sense a loss of proximity between the first device and the second device and signal the first network from the first device to establish a conference call between the first device and the second device.

In another aspect of a particular embodiment the first device is a wireline base station telephone and the second device is a mobile telephone. In another aspect of a particular embodiment the computer program further includes instructions to sense a proximity event between the first device and a third device, instructions to send the communication address for the first device from the first device to the third device over a wireless communication path between the first device and the third device, and instructions to signal a third network to establish a conference call between the first device and the third device. In another aspect of a particular embodiment sensing a proximity event further includes accepting a signal from a device selected from the group consisting of the second device and the first device to establish a conference call between the first device and the second device.

In another particular embodiment a computer readable medium containing a computer program for execution by a processor is disclosed. The computer program includes instructions to sense a proximity event between a first device associated with a first network and a second device associated with a second network, instructions to send a first communication address for the first device from the first device to the second device over a wireless communication path between the first device and the second device, and instructions to signal the second network from the second device to establish a conference call between the first device and an ongoing call on the second device.

In another aspect of a particular embodiment the first network and the second network are the same network. In another aspect of a particular embodiment the communication address is sent using a short messaging service message. In another aspect of a particular embodiment the computer program further includes instructions to sense a loss of proximity between the first device and the second device and instructions to signal the first network from the first device to establish a conference call between the first device and the second device.

In another aspect of a particular embodiment wherein the first device is a wireline base station telephone and the second device is a mobile telephone. In another aspect of a particular embodiment the computer program further includes instructions to sense a proximity event between the first device and a third device, instructions to send the communication address for the first device from the first device to the third device over a wireless communication path between the first device and the third device, and instructions to signal a third network to establish a conference call between the first device and the third device. In another aspect of a particular embodiment the computer program further includes instructions to accept a signal from a device selected from the group consisting of the second device and the first device to establish a conference call between the first device and the second device.

In another particular embodiment a data structure in memory is disclosed. The data structure includes a base station identifier field for containing data indicative of a base station identifier, a base station communication address field for containing data indicative of a base station communication address, a mobile device identifier field for containing data indicative of a mobile device identifier, a mobile device communication address for containing data indicative of a mobile device communication address, and a proximity field for indicating a proximity state between the base station and the mobile device.

An illustrative embodiment uses wireless proximity detection, for example, Bluetooth technology to sense the presence of a remote device within a proximity zone around a base station and to signal between the base station and the remote device wirelessly. By using Bluetooth to associate the mobile phone with a base station, it eliminates the need for a custom physical connection cradle for each phone model and shape. When the mobile phone is in proximity of the base station, the mobile phone contacts its mobile phone network to set up call forwarding to the base station landline phone number. In a particular illustrative embodiment telephone numbers for mobile devices and base stations are either stored in memory accessible to the mobile phone and base station or communicated wirelessly between the mobile phone and base station during the device discovery and proximity sensing process.

In an illustrative embodiment the user can transfer an ongoing call between a third party caller and the mobile phone to the landline phone whenever the devices are close enough together to be associated with each other or when requested by a mobile phone user by pressing a conference call keypad sequence on the mobile telephone keypad or the base station telephone keypad.

In an illustrative embodiment, a mobile phone and a CPE device or base station can detect each other through proximity detection, such as, the Bluetooth protocol. In one embodiment, the mobile phone 110 will set up call forwarding to forward all calls to the base station 112 when the mobile phone 110 is in proximity of the base station 112. The base station 112 forwards all calls to the mobile phone 110 if the base station does not detect the presence of the mobile phone. This provides the user with seamless mobility to automatically move between a home or office phone and a mobile phone. The user will have two or more telephone numbers (office phone number, home phone number and mobile phone number); however a caller trying to reach the user does not have to try all the numbers. All phone numbers will allow the caller to reach the called party. For example, if a caller calls a user's work phone number and the user is at home, the work base station is forwarded to the mobile phone which is forwarded to the home base station. Thus the caller reaches the user at home by calling the office.

The base station 112 may be incorporated into the landline home phone itself. The landline base station phone could be a standard time division multiplex (TDM) phone or it can be an internet protocol (IP) phone. The two functionalities can be integrated into one device.

Instead of having a one to one relationship between the mobile phone and the base station as described above, in another illustrative embodiment a multi-user relationship allows for a many-to-many or many-to-one relationship. Profiles are provided on mobile and base station phones to accommodate the multiple relationships. This allows multiple mobile phones to associate with one or more single base station phones. If there are four mobile phones in the household, and all phones are associated with the base station, then all calls to any of the mobile phones will be forwarded to the base station landline phone.

A single mobile phone can also be sequentially associated with more than one base station. When the user is at home, the user's mobile phone would be forwarded to their home base station landline phone. If the user is in the office, their mobile phone can be forwarded to their office base station phone.

Users may have address books on their mobile phone, home phone and office phone. Using the technology described above users could maintain one address book on their mobile phone. When a user associates their mobile phone with their home base station phone, their address book will be transferred to the home base station phone memory. This same process would occur when the user associates their phone with their office base station phone as described above.

Some prior systems required physically docking a mobile phone into a cradle. This cradle worked with only a select number of mobile phones which were designed to physically mate with the docking station. When docking the phone over and over again, the docking station may develop physical deterioration problems from repeated use. Wireless proximity detection and association technologies, such as, Bluetooth, eliminate the need for physical mating connections between a mobile phone and a base station and thus allow for more physically diverse phones to work with the base station.

Bluetooth also allows for the mobile phone to communicate with the base station without a physical connection, therefore increasing the life expectancy of the device and decreasing the number of base station failures. Wireless proximity detection technology also allows a many to one relationship between the base station and multiple diverse mobile phones.

Dual mode mobile phones (e.g., cellular and internet protocol) are still expensive compared to proximity detection or Bluetooth enabled mobile phone. The present disclosure describes how to provide seamless mobility without the need for dual mode mobile phones. In an illustrative embodiment, two single mode phones connected to different networks can be used to provide seamless mobility by sensing proximity to each other, exchanging phone numbers and signaling their respective networks to provide call forwarding and conference calling between the two phones. This will reduce the cost and complexity of seamless mobility since phones with proximity detectors, such as, Bluetooth mobile phones already exist today and cost less than dual mode mobile phones. This proximity detection technology provides the user with a single number reach capability as described above.

In another illustrative embodiment, a mobile phone can synchronize or merge or exchange address books with the base station desk phone through Bluetooth. This solves the problem of having different phone numbers stored in the home, office and mobile phone.

In another illustrative embodiment, radio technology such as Bluetooth technology is used to signal the base station wirelessly from the mobile phone. This particular embodiment covers the use of any radio technology so that the mobile phone and wired phone can detect each other (i.e. Bluetooth, WiFi, RFid, Wideband, etc.). Using Bluetooth to connect the mobile phone to the base station eliminates the need for a custom physical cradle for each different manufacturer's phone. Any standard Bluetooth enabled phone can use the base unit. When the mobile phone is in proximity to the base unit, the calls will be forwarded to the landline versus having to physically dock the phone in the cradle. There will be considerable less wear and tear on the base station since there is no docking and undocking and will allow for more mobile phones to be supported by the illustrative base station. When mobile phones and base stations do not exchange phone numbers, these phone numbers can be entered by the user from telephone keypad or the telephone network service provider and stored by the user in memory accessible as needed to the mobile phone and base station.

In some prior systems the product works by docking the phone into the cradle. If a user were on a call, the user would have to complete the call before docking the phone. In a particular embodiment of the wireless base station, the user can transfer a call in progress between the landline phone and mobile phone when the devices are associated with each other or when desired by pushing a conference call button or keypad sequence (e.g., "##") on the mobile telephone or base station telephone keypad.

In another particular embodiment, users have address books on their mobile phone, base station home phone and base station office phone. Using the technology described above; users could maintain one merged address book on their mobile phone containing the mobile, home and office address book contents. When they associate their mobile phone with their home phone, their address book will be available to them on their home phone. This same process would occur when the user associates their phone with their office phone as described above. The address book from the mobile phone is transferred to memory in the wireline phone via a wireless connection such as Bluetooth.

The illustrative embodiment allows users to give out either their mobile phone number, home phone number or office number and the system will find them. If the user is mobile and someone calls their house, the user can have the system forward the calls to their mobile phone. The home phone will not see a Bluetooth association with the mobile phone, so the home phone will forward the calls to the user's wireless number.

If someone calls the user's home number and the user is at the office, the home phone will forward the call to the user's wireless number. Since the user is in the office and their mobile phone has associated with the office phone, the mobile phone would forward that incoming call to their office phone. Thus an illustrative embodiment also allows mobile users to enjoy single number reach and at the same time save their wireless minutes since those calls will be redirected to a landline phone. Single number reach refers to the technology provided wherein a called party can be reached by any of the called parties associated phone numbers (home, office or wireless) by the calling party.

Turning now to FIG. 1, FIG. 1 illustrates a scenario in which a proximity event occurs as a mobile phone 110 is sensed to be outside of proximity zone 101 and all calls to the base station 112 are forwarded to mobile phone 110. FIG. 1 depicts an exemplary system 100 for call management. The system depicts a customer premise equipment system (base station) 112 that provides automated proximity-based call management. When a user is at home or at the office and within a CPE proximity zone 101, users may prefer to receive at the user's landline telephone 112 rather than utilize a mobile phone 110. However, when away from proximity of the landline telephone, the user may prefer to receive calls using their mobile phone 110. Generally, when a user is proximate (within a proximity zone, for example, 10-30 meters from the base station) to a fixed base station, such as at a home or office, calls or data are routed to a phone number for the home or office base station 112 and when the user is not proximate to a base station, calls or data are routed to a mobile phone number.

In one particular embodiment, a base station 112 associated with the landline base station location senses the presence of the user by detecting the presence of a mobile device 110 associated with the user. When the user is proximate to the landline base station location (within the proximity zone 101), calls and data addressed to the landline telephone number or communication address are received on the base station landline telephone. However, when the user is not proximate to the landline base station location, calls and data addressed to the base station landline phone number are forwarded or redirected to an alternate telephone number or communication address, such as a telephone number for a mobile device 110. For example, the base station telephone or mobile telephone 110 includes a device that sends flash-hook forward commands to forward an incoming call or #-commands to manipulate call redirection parameters at the service control point (SCP) or service switch point (SSP) in the PSTN 107 in the case of the base station.

In FIG. 1, the base station and mobile phone include a proximity sensor 115, a call management processor (CMP) 111 and memory 113. The proximity sensor 115 is coupled to or communicates with the CMP. The proximity sensor 115 in base station 112 senses whether a mobile device 110 is proximate to the base station 112. The proximity sensor 115 communicates this result to the CMP. The CMP uses this information and other information (e.g., phone numbers) to determine whether to activate or deactivate call forwarding or conference calling between the mobile phone and base station phone. For example the CMP may communicate through a network such as a PSTN 107 to a SSP 114 or database 109 for the base station telephone that controls call forwarding in the SCP in an advanced intelligent network (AIN). In a particular illustrative embodiment, the proximity sensor also receives the telephone number and device identifier of the discovered device and provides them to the processor with which the proximity sensor is associated.

In one exemplary embodiment, the proximity sensor 115 and CMP 111 are built into a landline communications device 112, such as a landline telephone system or answering machine. In alternate embodiments, the proximity sensor and CMP 104 may be built into a cell phone charger or stand-alone device. In each of these exemplary embodiments, the CMP 104 is connected to a network 107, such as a public switch telephone network (PSTN). The CMP 104 may activate or deactivate call forwarding using a flash command or pound sign command, for example, as permitted by the functionality of the network and associated server systems SSP 114 and SCP. An exemplary server system is a service control point (SCP) 117 in an advanced intelligent network (AIN) as commonly used in telephony infrastructure.

In these exemplary embodiments, when the mobile device 110 is proximate to the base station proximity sensor 115, the base station 112 CMP 111 may signal through the network 107 to activate or deactivate call forwarding and receive calls at the landline base station phone 112. Alternately, when the mobile device 110 is not proximate to the base station proximity sensor 111, the CMP 111 may activate call forwarding on an associated landline to an alternate number such as the mobile telephone number.

The mobile device 110 may be a cellular telephone, mobile phone or other mobile telecommunications device. Alternately, the mobile device 110 may be a keychain fob, smart card, or other device that would indicate the presence of an individual.

The base station proximity sensor 115 senses the presence of the mobile device 110, by use of radio frequency transmissions, infrared or other light based transmissions, or ultrasonic transmissions. For example, the proximity sensor may utilize short range networking standards such as Bluetooth, RTM, or 802.11. In alternate illustrative embodiments, the proximity sensor 115 may communicate with the mobile device 110 using short message service messages. The proximity sensor 115 may alternately listen to control channels of mobile telecommunications systems. In another illustrative alternate embodiment, the proximity sensor may detect a radio frequency beacon. In other illustrative embodiments, the proximity sensor may use a contact sensor, infrared detection system, or sonic detection system.

In another illustrative embodiment the base station proximity sensor 115 detects a mobile device 110 and sends a base station telephone number for the base station to the mobile device via wireless messaging (e.g., SMS). Similarly the mobile device 110 proximity sensor 115 discovers or detects the base station 112 and sends a telephone number associated with the mobile device 110 to the base station 112. Using this information from the wireless message the base station can conditionally signal the network 107 to forward or conference calls to the phone number associated with the mobile device. Likewise the mobile device can use the information from the wireless message to forward or conference calls to the phone number associated with the base station.

Figure 2:
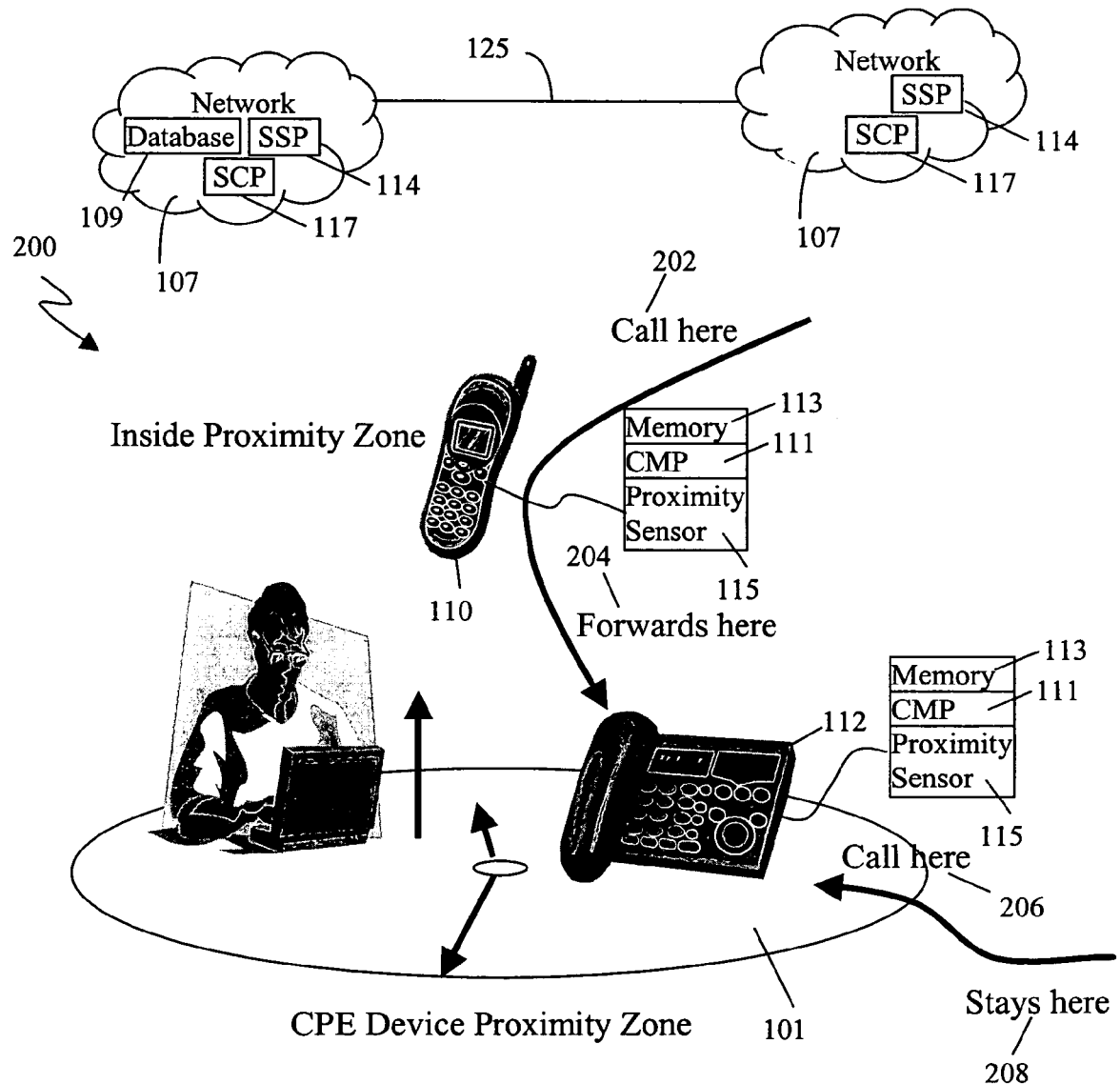
FIG. 2 depicts an illustrative embodiment of a call management system for a mobile phone inside of a proximity zone.
Figure 3:
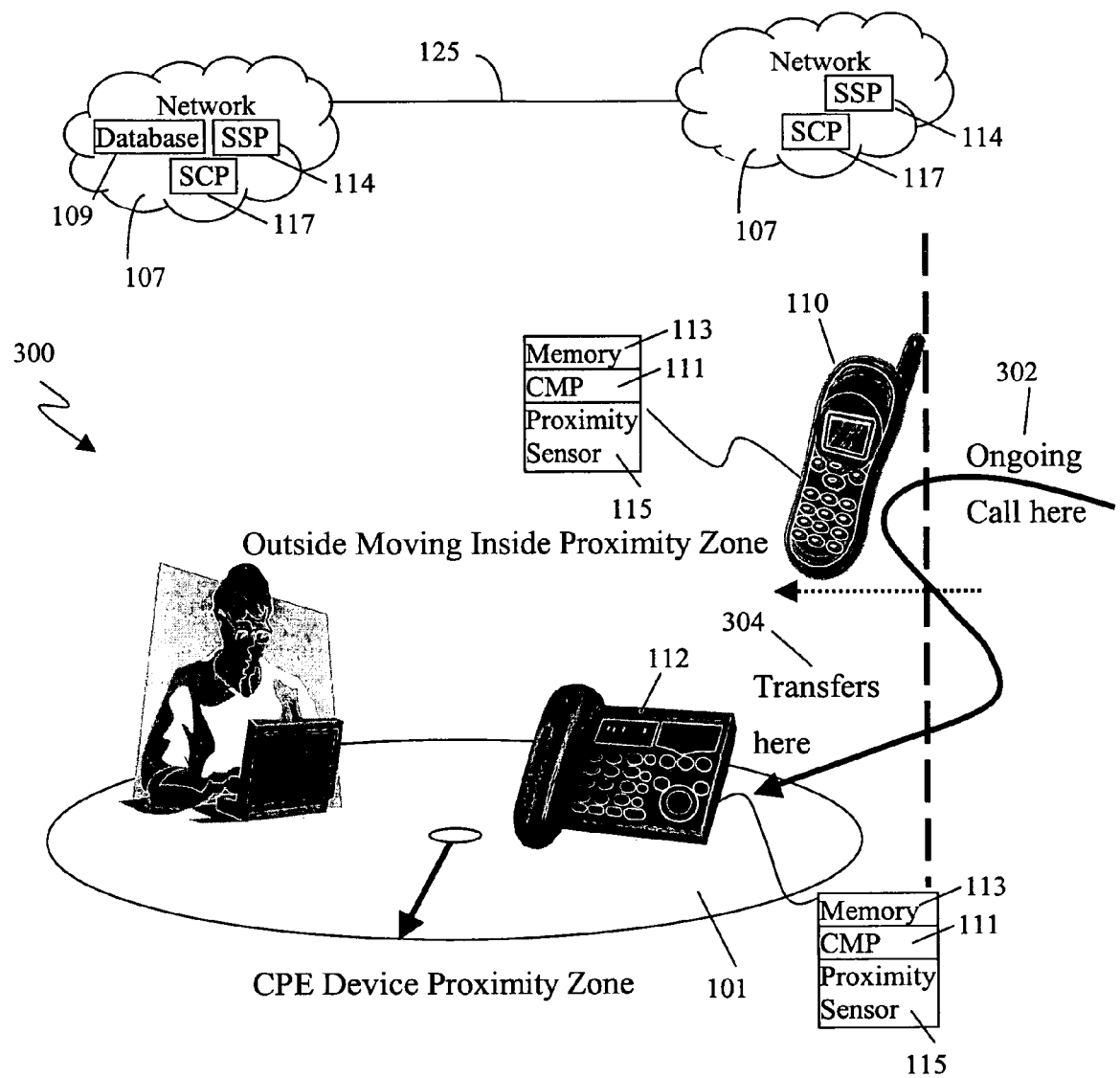
FIG. 3 depicts an illustrative embodiment of a call management system for a mobile phone moving out of a proximity zone.
Figure 4:
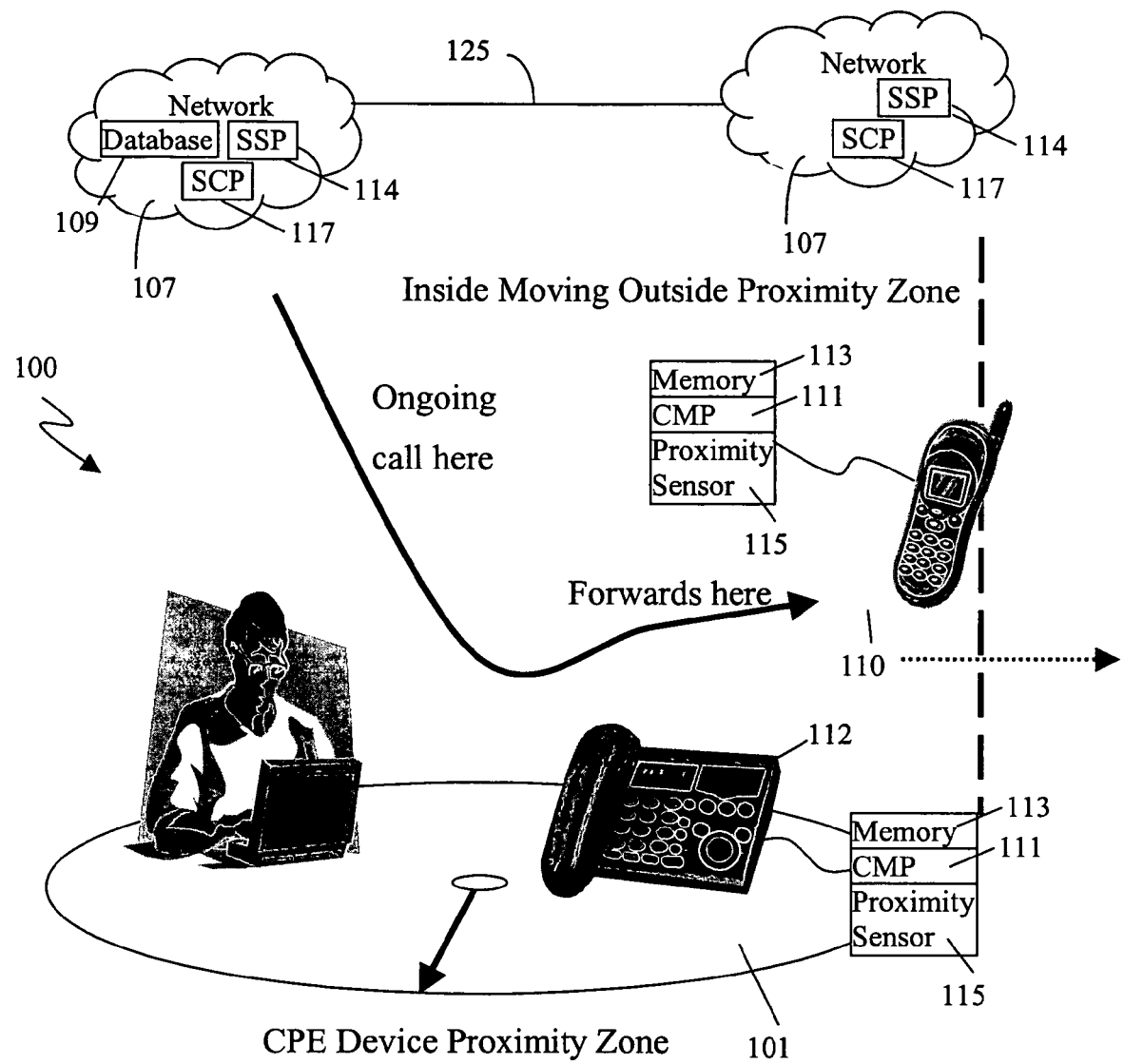
FIG. 4 depicts an illustrative embodiment of a call management system for a mobile phone moving into a proximity zone.

Turning now to FIG. 2, FIG. 2 illustrates a scenario in which the mobile phone is inside the proximity zone and all calls to the mobile phone are forwarded to the base station phone. Turning now to FIG. 3, FIG. 3 illustrates a scenario in which an ongoing call to the mobile phone is transferred to the base station phone when the mobile phone moves to enter the base station proximity zone. Turning now to FIG. 4, FIG. 4 illustrates a scenario in which an ongoing call to the base station phone is transferred to the mobile phone when the mobile phone moves to leave the proximity zone. Operations and functions performed and data structures utilized in an illustrative embodiment under the scenarios depicted in FIGS. 2-5 are discussed below under FIGS. 5-13.

Figure 5:
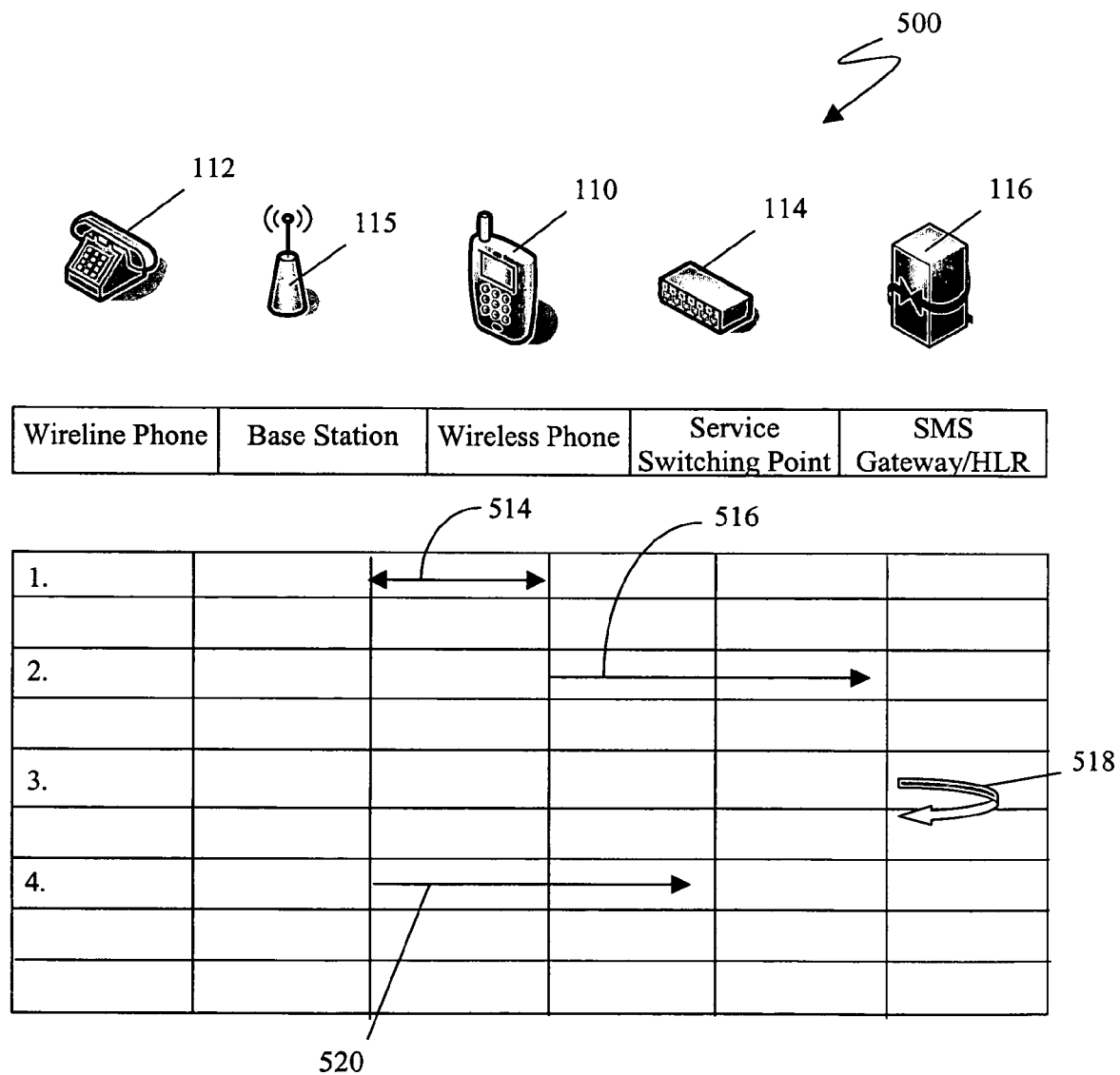
FIGS. 5-8 illustrate an illustrative embodiment of functions performed based occurrence of a proximity event.

Turning now to FIG. 5, mobile phone 110 detects base station 112 and base station 112 detects mobile phone 110 via wireless technologies such as Bluetooth, WiFi, etc. In the present illustrative example, the wire line phone 112 has the base station proximity detector 115 built into the mobile phone 110. Mobile phone is detected as in the proximity zone 101 in event 514. Upon occurrence of this proximity event mobile phone 110 sends a wireless message, e.g., Simple Message Services (SMS), to SMS Gateway 116 in event 516. In a particular embodiment, the SMS message contains the base station telephone number. In another particular embodiment the base station telephone number is stored in memory and accessed by the mobile phone as needed to implement call forwarding or conference calling.

SMS Gateway forwards the SMS message to the home location registry (HLR) 116 in the wireless network 119. In event 518, the HLR turns on call forwarding of the mobile phone 110 telephone number to the wire line phone 112 telephone number. Additionally, if a user wants a single number reach (where callers want to dial a single number to reach a user at any of his numbers), meaning that the calling party can reach the called party via the home phone or mobile phone, then the wire line call forwarding will be enabled. Base station 112 signals the SSP 114 in network to disable Call Forwarding on the wire line phone to the mobile phone when the mobile phone is in the proximity zone 101. Base station 112 signals the SSP 114 to enable Call Forwarding on the wire line phone 112 when the mobile phone is outside the proximity zone 101.

Figure 6:
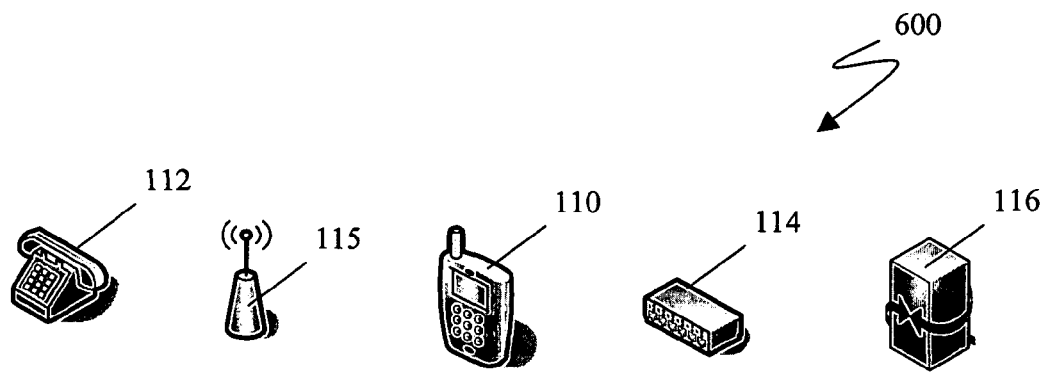
Figure 6:
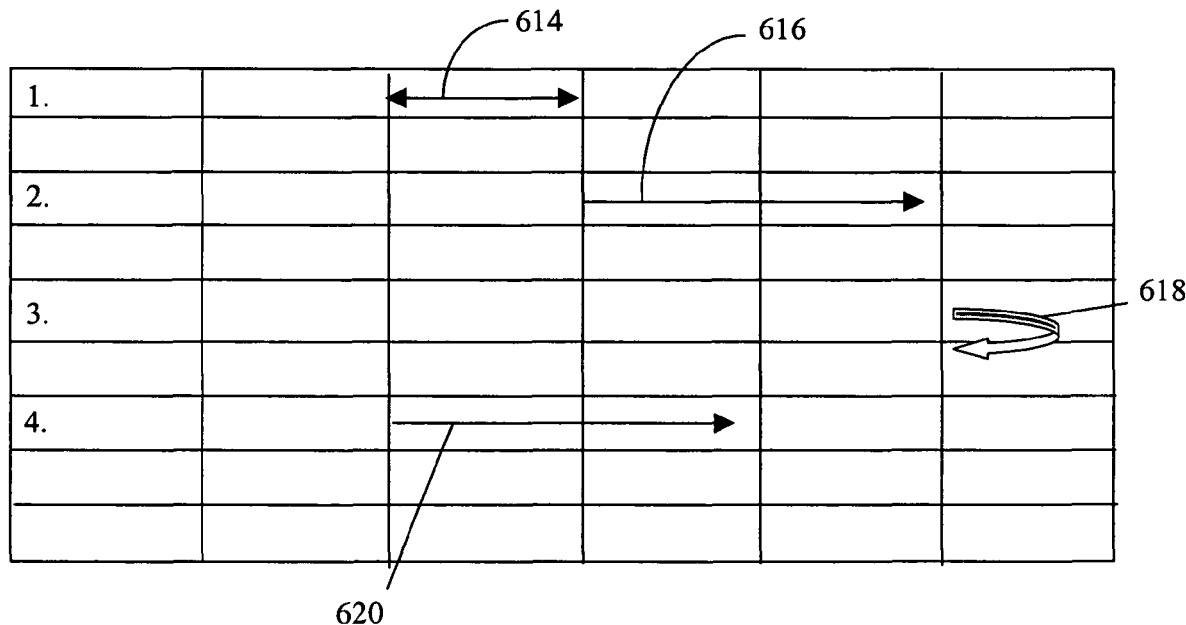

Turning now to FIG. 6, at event 614 the wire less phone 110 detects loss of connectivity to base station 112 meaning that the base station has gone down, failed or the mobile phone has moved outside of the proximity zone 101. At event 616, the mobile phone 110 sends a SMS message to SMS Gateway 116. The SMS Gateway 116 forwards the SMS message to the home location register (HLR). The HLR is a database that holds subscription data about every subscriber in a mobile (i.e., cell phone) network. An HLR is a permanent SS7 database used in cellular networks. The HLR is located on the SCP of the cellular provider. The HLR is used to identify subscribers and control features and services such as call forwarding and conference calling. HLR turns off call forwarding of the mobile phone at event 618. At event 620, if a user wants a single number reach functionality, meaning that the calling party can reach the user (called party) via the home phone 112 or mobile phone 110 by dialing a single number, then the wire line call forwarding will be enabled to call the mobile phone. Base station signals the SSP 114 to enable Call Forwarding on the wire line phone 112 when the mobile phone 110 is outside the proximity zone 101.

Figure 7:
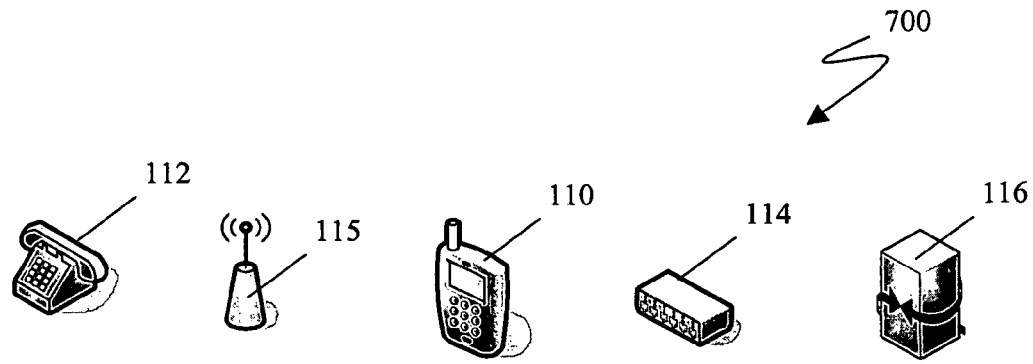
Figure 7:
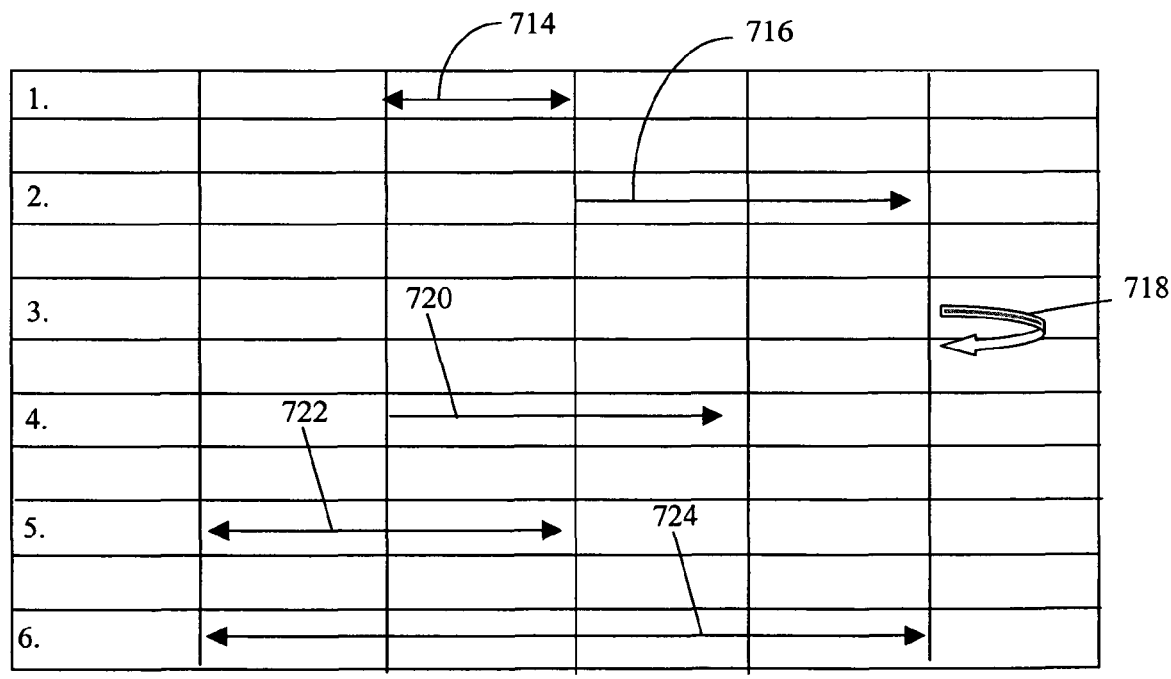

Turning now to FIG. 7, a mobile phone 110 detects base station 112 and base station 112 detects the mobile phone 110 via wireless technologies such as Bluetooth, WiFi, etc. Mobile phone is inside the proximity zone 101. At event 616, the mobile phone 110 sends a SMS message to the SMS Gateway 116. The SMS Gateway 116 forwards the SMS to the HLR 116. In event 618, the HLR turns on call forwarding of the mobile phone 110 to the wire line phone 112. If a user wants a single number reach, meaning that the calling party can reach the user via the home phone 112 or mobile phone 110, then the wire line call forwarding will be enabled to forward the base station phone to the mobile phone.

The base station signals the SSP 114 to disable Call Forwarding on the wire line phone when the mobile phone 110 is in the proximity zone 101. Base station 112 signals the SSP 114 to enable Call Forwarding on the wire line phone 112 when the mobile phone 110 is outside the proximity zone 101. If the user is on a call (ongoing call in progress) with the mobile phone, the mobile phone user can press a pre-programmed keypad button or phone keypad sequence on the mobile phone 110 that will signal the mobile network to initiate a 3-way conference call with the ongoing call, the mobile phone and wire line phone 112. This can be accomplished by dialing the wire line phone 112 from the mobile phone 110. Once the wire line 112 phone picks up, the mobile phone 110 can be disconnected from the call.

Figure 8:
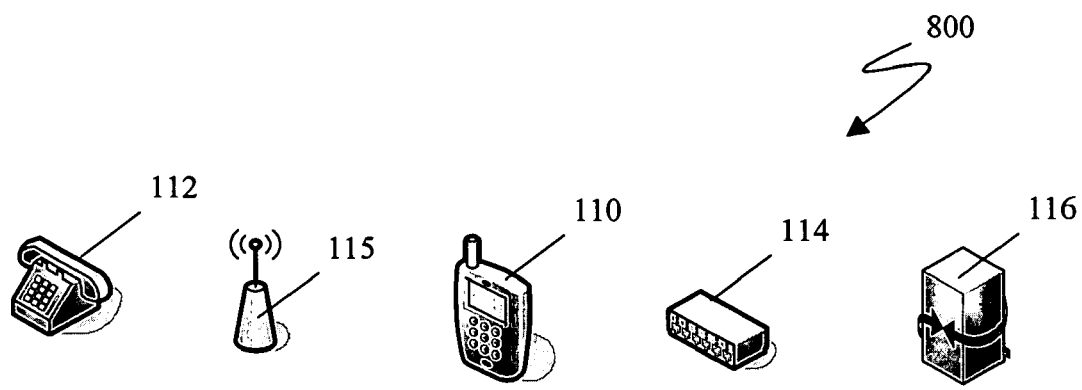
Figure 8:
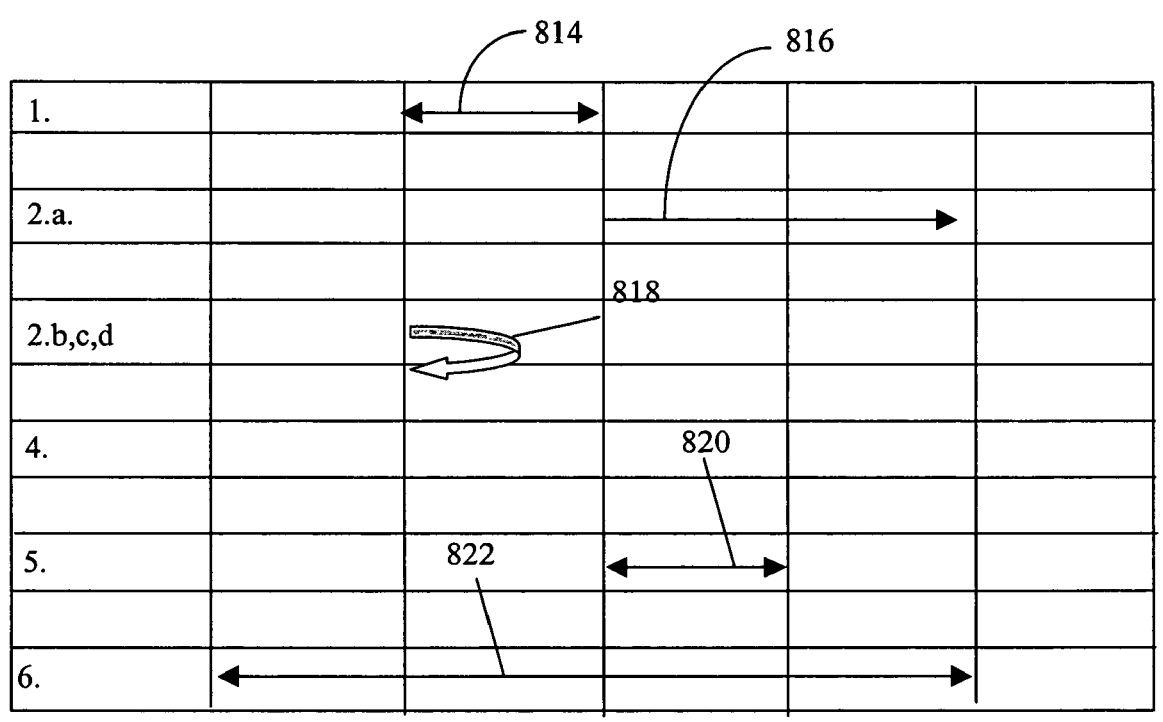

Turning now to FIG. 8, in order to simplify the call flow, it is assumed that the wire line phone 112 and the base station 112 have been integrated into one device. It is also assumed that the wire line phones and mobile phones have conference calling (3 way calling) enabled on them. At event 814, an ongoing call exists on the wire line phone through the SSP. A user wants to continue the call on their mobile phone. At event 816, a wire line phone user can press a pre-programmed keypad sequence on the integrated base station/wire line phone 112 that will start a 3-way conference call with the mobile phone 110 to initiate transferring the call to the mobile phone. The CMP 112 on the base station senses the activation of the pre-programmed button and performs the following functions.

The base station CMP signals the SMS Gateway to disable call forwarding for the mobile phone, Flash hooks the wire line phone, dials the mobile phone number and waits for the mobile phone to answer and then the user can hang up the base station land line and continue the ongoing call on the mobile phone. At event 822 the base station wire line phone has conferenced the mobile phone into the ongoing call and now the user can continue the ongoing call on the mobile telephone. The Service Switch Point (SSP) has the switching function of ordinary switches, and can trigger the intelligent calls, and send the call information to the SCP. The SCP controls the further operation, e.g., prompt of playing announcement or receiving digits, or selecting route.

Figure 9:
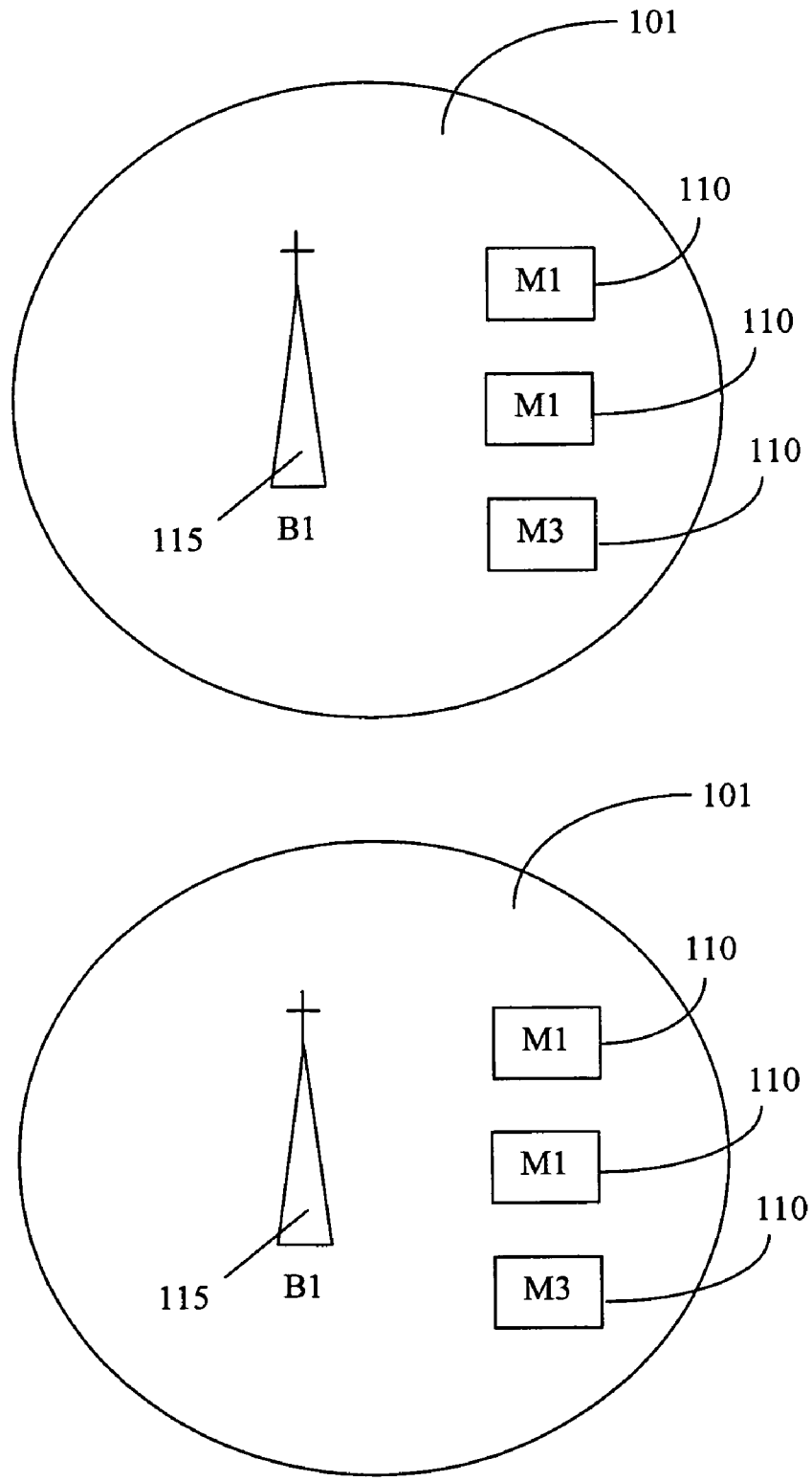
FIG. 9 illustrates an illustrative embodiment of a multiplicity of mobile devices associated with a multiplicity of base stations.

Turning now to FIG. 9, multiple base stations 115 B1 and 115 B2 can be associated with multiple mobile devices M1, M2, M3, M4, M5, and M6 110. Each mobile device M1-M6 can be associated with either base station B1 or base station B2 when inside base station proximity zone 101 or when requesting association or disassociation with a base station by entering a predetermined phone keypad sequence. The base stations and mobile devices use the data structure 1000 as described in FIG. 10 to store base station identifiers, base station communication addresses (telephone numbers), mobile device identifiers, e.g., mobile device communication address (e.g., telephone numbers) and proximity status to manage calls between the mobile devices and the base stations.

Figure 10:
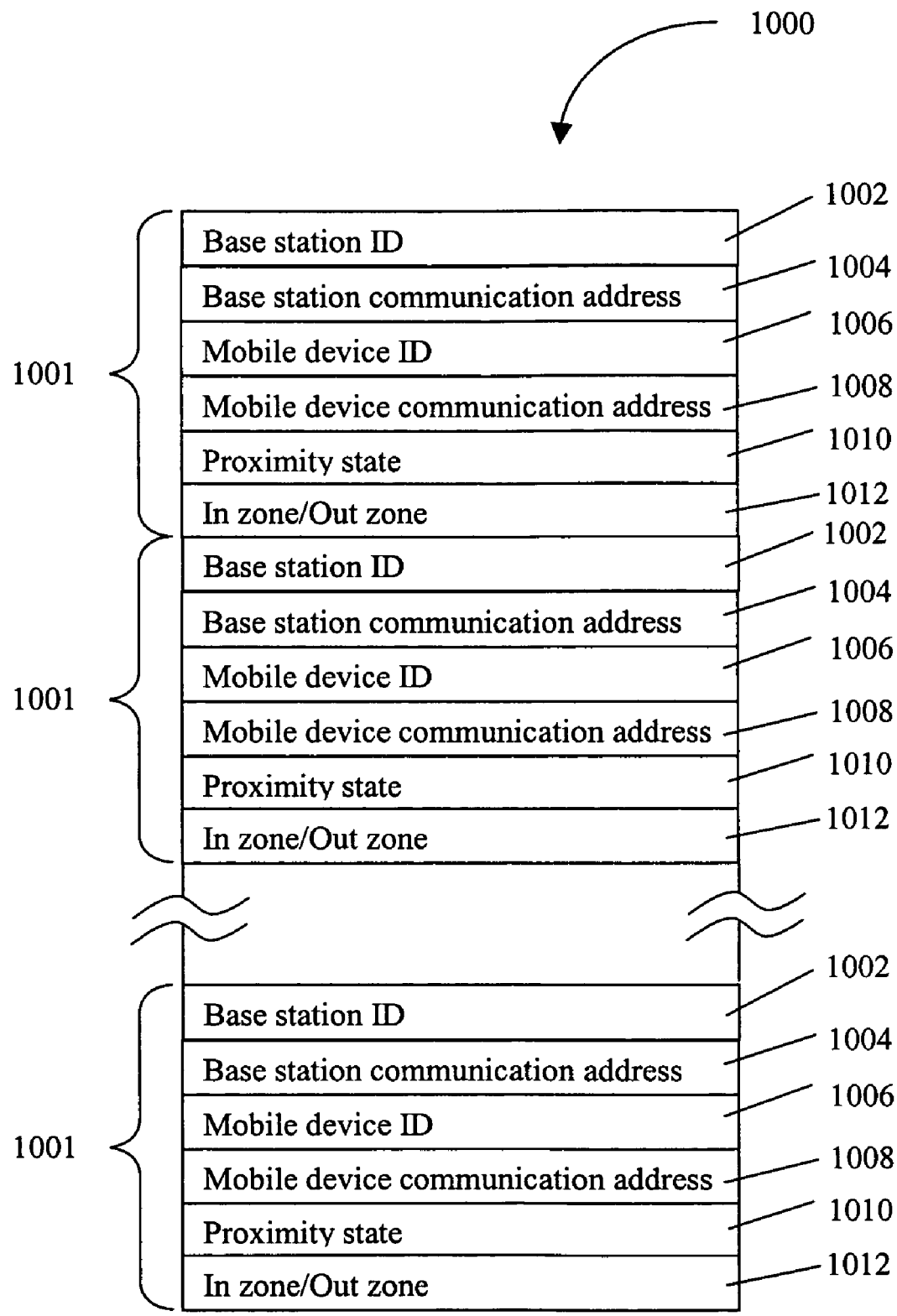
FIG. 10 illustrates an illustrative embodiment of a data structure used in a call management system.

Turning now to FIG. 10, an illustrative embodiment of a data structure 1000 is illustrated. The data structure 1000 resides in memory and includes but is not limited to a base station identifier field 1002 for containing data indicative of a base station identifier; a base station communication address field 1004 for containing data indicative of a base station communication address; a mobile device identifier field 1006 for containing data indicative of a mobile device identifier; a mobile device communication address 1008 for containing data indicative of a mobile device communication address; and proximity fields 1010, 1012 for indicating a proximity state between the base station and the mobile device. The communication address in the illustrative embodiment is a telephone number but could also be any communication address, such as a uniform resource locator (URL), email address, or IP address, etc.

Figure 11:
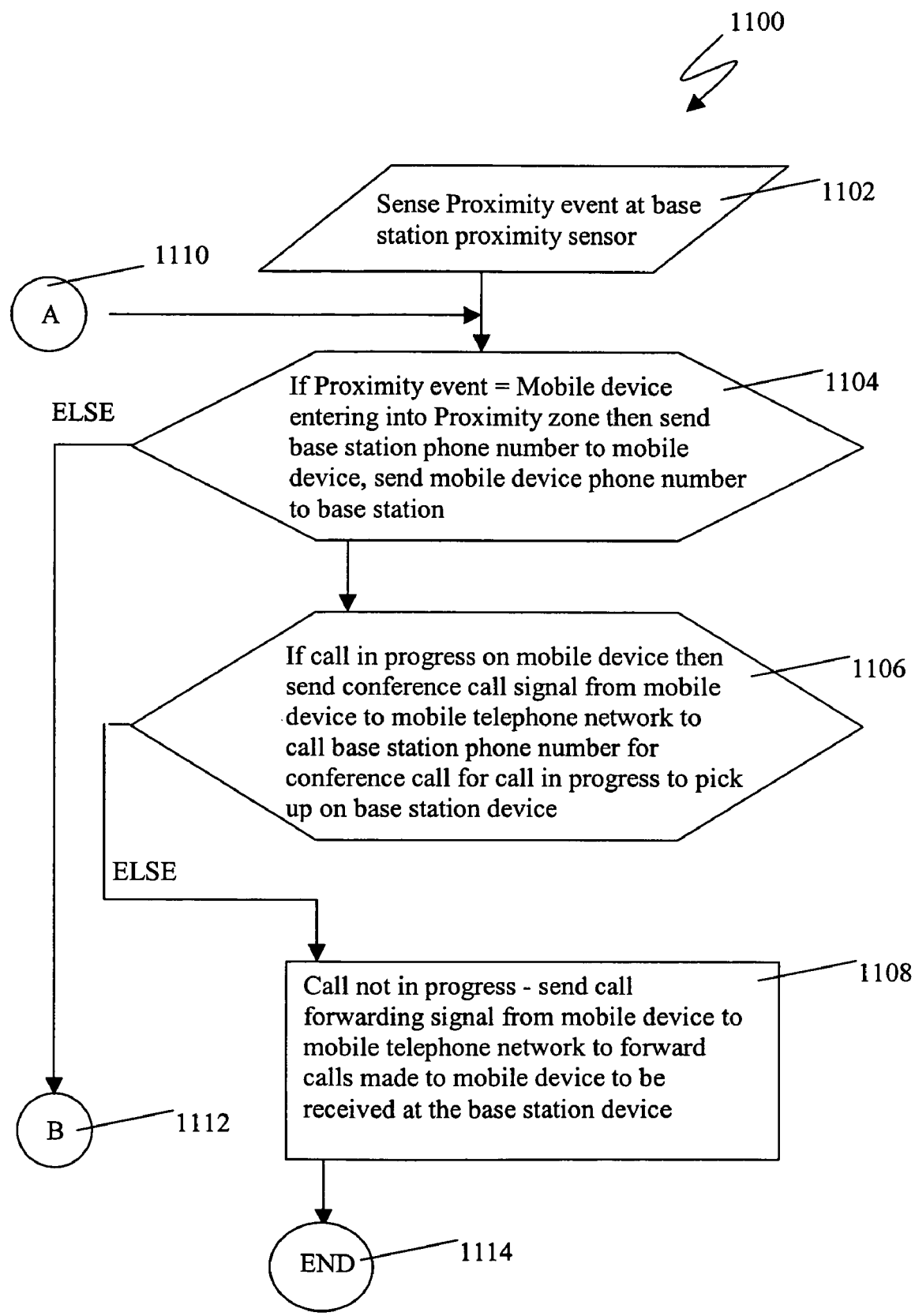
FIGS. 11-13 illustrate flow charts of proximity based functions performed in a particular illustrative embodiment.

Turning now to FIG. 11 is a flowchart depicting the sensing of a proximity event at the base station proximity sensor at 1102. If the proximity event equals a mobile device entering into the proximity zone then the base station phone number is sent to the mobile device and mobile device phone number is sent to the base station at 1104. If the call in progress is on a mobile device, then a conference call signal is sent from the mobile device to a mobile telephone network to call the base station phone number for a conference call for the call in progress to be picked up on the base station phone device at 1106. If a call is not in progress the mobile phone sends a call forwarding signal from the mobile device to the mobile telephone network to forward calls made to the mobile device to be received at the base station device at 1108.

Figure 12:
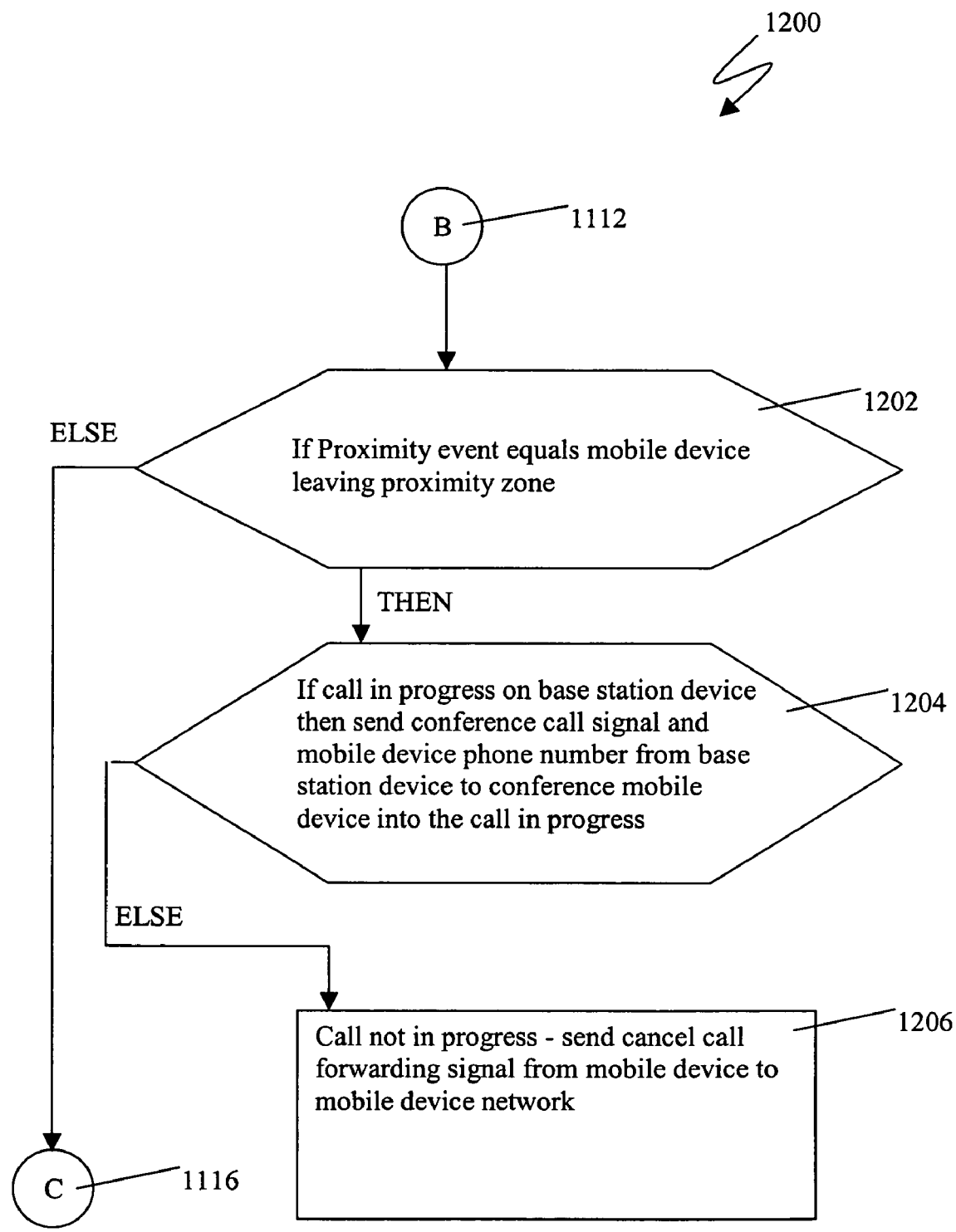

Turning now to FIG. 12 is a flowchart depicting call management functions performed for the mobile device leaving the proximity zone. If the proximity event equals a mobile device leaving proximity zone at 1202 then the method proceeds to 1204. If a call is in progress on the base station device, then the conference call signal and mobile device phone number is sent from the base station device to the "conference" (add into the call) the mobile device into the call in progress at 1204. If the call is not in progress, a cancel call forwarding signal is sent from the mobile device to the mobile device network at 1206.

Figure 13:
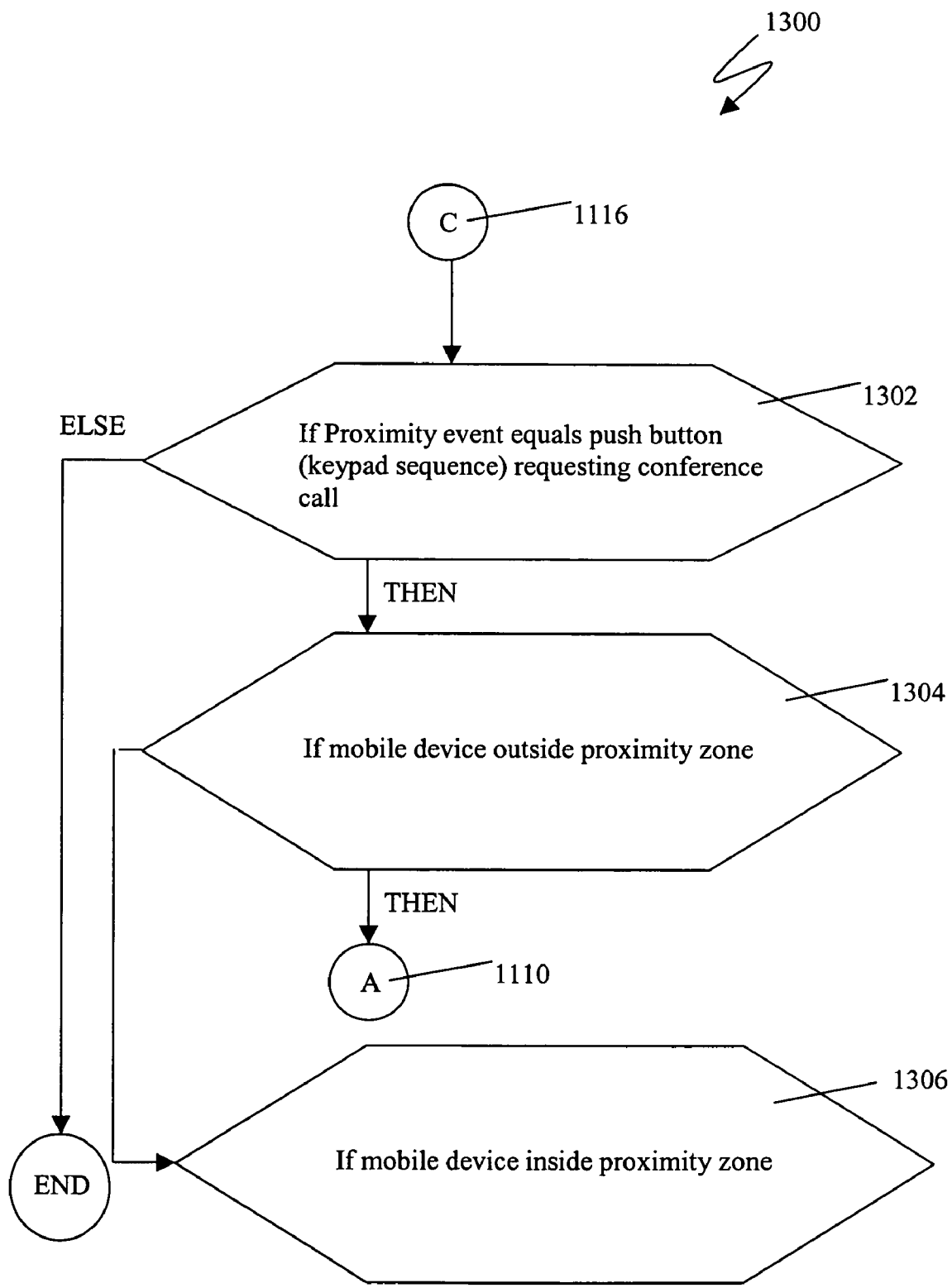

Turning now to FIG. 13 is a flowchart depicting the proximity event equaling a push button (keypad sequence) requesting a conference call. If the proximity event equals a phone keypad sequence or button at 1302 then the method continues on to 1304. If the mobile device is outside the proximity zone at 1304 then the method continues on to 1306. If the mobile device is inside the proximity zone at 1306 the sequence ends at 1112.

Figure 14:
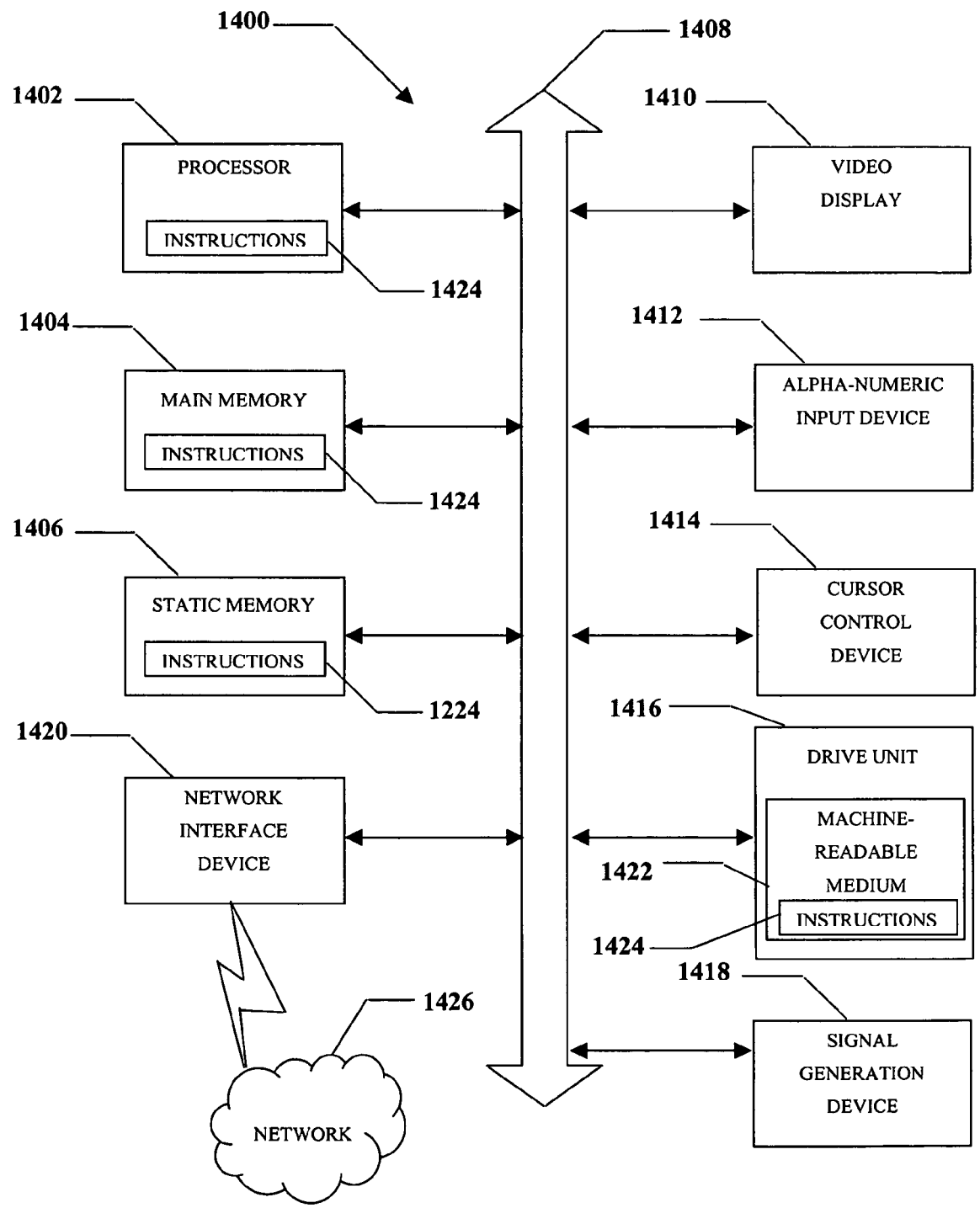
FIG. 14 is a diagrammatic representation of a machine in the form of a computer system within which a set of instructions, when executed, may cause the machine to perform any one or more of the methodologies of the illustrative embodiment.

Turning now to FIG. 14 the computer system 1400 may include a processor 1402 (e.g., a central processing unit (CPU), a graphics processing unit (GPU), or both), a main memory 1404 and a static memory 1406, which communicate with each other via a bus 1408. The computer system 1400 may further include a video display unit 1410 (e.g., liquid crystals display (LCD), a flat panel, a solid state display, or a cathode ray tube (CRT)). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a machine-readable medium 1422 on which is stored one or more sets of instructions (e.g., software 1424) embodying any one or more of the methodologies or functions described herein, including those methods illustrated in herein above. The instructions 1424 may also reside, completely or at least partially, within the main memory 1404, the static memory 1406, and/or within the processor 1402 during execution thereof by the computer system 1400. The main memory 1404 and the processor 1402 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 1424, or that which receives and executes instructions 1424 from a propagated signal so that a device connected to a network environment 1426 can send or receive voice, video or data, and to communicate over the network 1426 using the instructions 1424. The instructions 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The invention claimed is:

1. A computer based method for proximity-based call management, comprising:
sensing on a home base station, a first proximity event between a mobile device associated with a cellular network and the home base station associated with a land line telephone network;
when the first proximity event indicates that the mobile device is proximate the home base station, if an ongoing call is in progress on the mobile device, establishing a three way call between the ongoing call with a third party on the mobile device on the cellular network and the home base station and if an ongoing call is not in progress, establishing call forwarding from the mobile device to the home base station;
when the first proximity event indicates that the mobile device is not proximate the home base station, establishing call forwarding from the mobile device to the home base station; and
when the first proximity event indicates that the mobile device is not proximate the home base station and a second proximity event indicates that the mobile device is proximate a business base station, establishing call forwarding from the home base station to the mobile device and establishing call forwarding from the mobile device to the business base station.

2. The method of the claim 1, the method further comprising:
signaling the land line network from the home base station to establish the conference call between the mobile device, the third party and the home base station for the ongoing call; and
when the first proximity event indicates that the mobile device is not proximate the business base station and the mobile device is proximate the home base station, establishing call forwarding from the business base station to the mobile device and establishing call forwarding from the mobile device to the home base station.

3. The method of claim 1, the method further comprising:
transferring address book data from the mobile device to the home base station when the mobile device becomes proximate the home base station and transferring the address book from the mobile device to the business base station when the mobile device becomes proximate to the business base station.

4. The method of claim 1, further comprising:
sensing a loss of proximity between the mobile device and the home base station; and
automatically signaling the land line network from the home base station to transfer the ongoing call back to the mobile device.

5. The method of claim 1, wherein the home base station has a first telephone number, the mobile device has a second telephone number and the business base station has a third telephone number.

6. The method of claim 1, further comprising:
sending a communication address for the mobile device from the mobile device to the business base station over a wireless communication path between the mobile device and the business base station; and
signaling a third network to establish a conference call between the first mobile device and the business base station.

7. The method of claim 1, wherein sensing a proximity event further comprises:
accepting a signal from a device selected from the group consisting of the mobile device and the home base station to establish a conference call between the mobile device and the home base station.

8. A proximity based call management apparatus, comprising:
a processor coupled to a tangible non-transitory computer readable memory containing data;
a proximity sensor in data communication with the processor;
a network interface in data communication with the processor; and
a computer program stored in the computer readable memory for execution by the processor, the computer program comprising:

instructions to sense a proximity event between a mobile device associated with a cellular network and a home base station device associated with a land line telephone network;

instructions to establish a three way call for an ongoing call with a third party on the cellular network on the mobile device and the land line network on the home base station when the proximity event indicates that the mobile device is proximate the home base station when an ongoing call is in progress on the mobile device;

instructions to establish call forwarding from the mobile device to the home base station when the proximity event indicates that the mobile device is not proximate the home base station when an ongoing call is not in progress on the mobile device; and instructions to establish call forwarding from the home base station to the mobile device and establish call forwarding from the mobile device to the business base station when the proximity event indicates that the mobile device is not proximate the home base station and a second proximity event sensed on a business base station indicates that the mobile device is proximate the business base station.

9. The apparatus of claim 8, the computer program further comprising instructions to signal the land line network from the home base station to establish a conference call between the mobile device, the third party and the home base station for the ongoing call.

10. The apparatus of claim 8, wherein the instructions to establish call forwarding are sent using a short messaging service message.

11. The apparatus of claim 8, the computer program further comprising instructions to sense a loss of proximity between the mobile device and the home base station and
instructions to transfer the ongoing call back to the mobile device.

12. The apparatus of claim 8, wherein the home base station is a wireline base station telephone and the mobile device is a mobile telephone.

13. The apparatus of claim 8, the computer program further comprising instructions to sense a proximity event between the mobile device and the business base station, instructions to send a communication address for the mobile device from the mobile device to the business base station over a wireless communication path between the mobile device and the business base station, and instructions to signal a business network to establish a conference call between the mobile device and the business base station.

14. The apparatus of claim 8, wherein sensing a proximity event further comprises:
accepting a signal from at least one of the home base station and the mobile device to establish a conference call between the first mobile device and the home base station.

15. A non-transitory computer readable medium containing a computer program for execution by a processor, the computer program comprising:
instructions to sense a proximity event between a mobile device associated with a cellular network and a second home base station device associated with a land line telephone network;
instructions to establish a three way call between an ongoing call with a third party on the cellular network on the mobile device and the land line network on the second home base station when the proximity event indicates that the mobile device is proximate the second home base station;

instructions to establish call forwarding from the mobile device to the second home base station when the proximity event indicates that the mobile device is proximate the second home base station and an ongoing call is not in progress on the mobile device; and instructions to establish call forwarding from the second home base station to the mobile device and establish call forwarding from the mobile device to a business base station when another proximity event indicates that the mobile device is not proximate the second home base station and the mobile device is proximate the business base station.

16. The medium of claim 15, the computer program further comprising:
instructions to transfer address book data from the mobile device to the home base station when the mobile device becomes proximate the home base station and transferring the address book from the mobile device to the business base station when the mobile device becomes proximate to the business base station.

17. The medium of claim 15, wherein commands used to transfer the ongoing call are sent using a short messaging service message.

18. The medium of claim 15, the computer program further comprising:
instructions to sense a loss of proximity between the mobile device and the home base station and instructions to automatically transfer an ongoing call with the third party on the home base station back to the mobile device upon occurrence of the loss of proximity between the mobile device and the home base station.

19. The medium of claim 15, wherein the home base station is a wireline base station telephone and the mobile device is a mobile telephone.

20. The medium of claim 15, the computer program further comprising:
instructions to sense a proximity event between the mobile device and the business base station;
instructions to send a communication address for the mobile device from the mobile device to the business base station over a wireless communication path between the mobile device and the third device, and
instructions to signal a third network to establish a conference call between the mobile device and the business base station.

21. The medium of claim 15, the computer program further comprising:
instructions to accept a signal from a device selected from the home base station and the mobile device to establish a conference call between the mobile device and the home base station.

22. A data structure embedded in a tangible non transitory computer readable memory comprising:
a base station identifier field for containing data indicative of a base station identifier;
a base station communication address field for containing data indicative of a base station communication address;
a mobile device identifier field for containing data indicative of a mobile device identifier;
a mobile device communication address for containing data indicative of a mobile device communication address; and
a proximity field for indicating the occurrence of a proximity event indicating a proximity state between the base station and the mobile device to automatically transfer an ongoing call with a third party on the mobile station to the base station upon occurrence of the proximity event.

* * * * *